Aug. 8, 1939.  T. C. BROWNING  2,168,512
AIR LINE TRAP
Filed Nov. 21, 1938
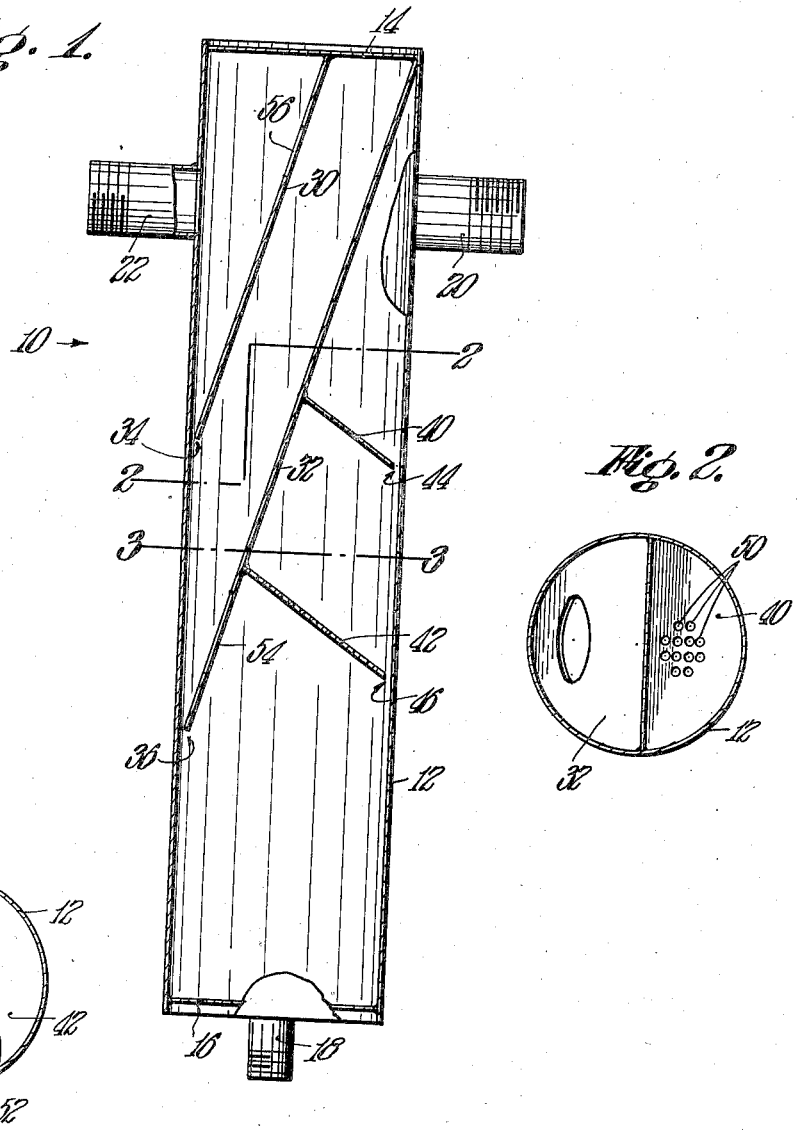
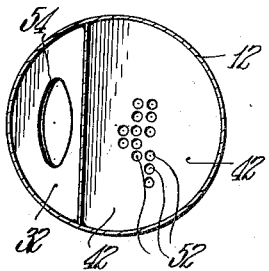
INVENTOR.
Thomas C. Browning, deceased
BY Sarah F. Browning, Administratrix
Watts C. Ron ATTORNEY.

Patented Aug. 8, 1939

2,168,512

UNITED STATES PATENT OFFICE 2,168,512

AIR LINE TRAP

Thomas C. Browning, deceased, late of Springfield, Mass., by Sarah E. Browning, administratrix, Springfield, Mass.

Application November 21, 1938, Serial No. 241,603

2 Claims. (Cl. 183—110)

This invention relates to improvements in traps for air lines used for purposes of aerating and ventilating and the like and it is directed more particularly to the provision of a novel device for trapping water, grease and dirt in compressed air lines.

It is one of the principal objects of the invention to provide a trap whereby water, grease and dirt will be extracted from the air as it is forced through an air line.

It is another object to provide a structure whereby the intermittent sound of air under pressure will be muffled as the water, grease and dirt are extracted therefrom.

It is a further object of the invention to provide a trap structure which is so arranged that its various parts, later to be more fully described, may be fitted together in various ways. The device may be of any desired size, and it may be arranged to accommodate pressures of various intensities. By reason of the novel construction of the invention, once the trap is installed in the line, it will require little or no maintenance.

It is still a further object to provide an improved device which is relatively simple in form and compact in size. It may be made more economically and with fewer operations in the manufacture of its parts as well as in the assembly thereof than prior devices known in the art.

Air has an objectionable tendency to absorb moisture and carry it when moved under pressure. At the same time dirt and other elements are likewise carried forward under pressure. The consequent deposition of these materials in certain quantities is not desirable.

Accordingly, means have been devised whereby this objection is obviated and the practice is overcome.

Various other novel features, advantages and objects of the invention will be hereinafter more fully described and referred to in connection with the accompanying drawing wherein:

Fig. 1 is a side elevational view of the device of the invention;

Fig. 2 is a sectional plan view on the line 2—2 of Fig. 1; and

Fig. 3 is a sectional plan view on the line 3—3 of Fig. 1.

Referring to the drawing in detail, the invention will now be described. Like numerals refer to like parts in the drawing.

The trap is indicated generally by 10 and it includes a length of pipe 12 which may be of standard form in most respects and it may be of any desired length and/or diameter.

A plate or cap 14 is fitted within the upper end of the pipe, as shown, while a similar member 16 may be associated with the lower end of the pipe 12 to close that end of the pipe.

Thus a cylindrical casing is provided with the upper and lower ends closed.

An air inlet 20 is formed at one side of the casing at the top. This inlet may be in the form of a nipple and it leads into and is secured to one side of the pipe 12.

A similar opening 22 leads out of and is secured to an opposite side of the pipe 12 and this is preferably located adjacent the upper end of the pipe. This is an air outlet and while it is shown as located diametrically opposite to the inlet, it may be positioned at any point on the surface of the casing.

A cylindrical reservoir is provided at the bottom of the casing. An outlet is provided in the lower end member 16 so that the reservoir may be emptied as desired. A drip pipe 18 is in communication with the outlet in the plate and extends downwardly from the trap.

Within the casing or pipe 12, there are disposed two obliquely inclined baffle plates which are indicated by 30 and 32. Preferably these plates are secured within the plate in parallelism, as shown, with their opposite ends held in place.

By inclining the plates, the water, dirt and other objectionable matters will flow by gravity toward the lowermost edges of the plates.

At these lowermost edges, means are provided for securing the plates to the casing in such a way that spaces or openings 34 and 36 are provided. This is for purposes as will hereinafter more fully appear.

Another pair of obliquely-inclined and spaced baffle plates 40 and 42 are secured within the pipe and these are located within the chamber of the pipe into which the inlet 20 leads. This chamber is obviously formed by the baffle plate 32 and the walls of the casing 12.

The plates 40 and 42 extend at an angle to the baffles 30 and 32, as shown, and they are disposed downwardly from the baffle 32. The plates are secured to plate 32 at their upper ends and the other ends are secured to the wall of the casing by such a means that spaces 44 and 46 are provided between the baffle plates and the casing, for purposes as will also hereinafter appear.

The upper plate 40 is obviously smaller in area than the lower plate 42 and it is perforated with one or more holes 50 in its center portion as shown in Fig. 2. It has been found desirable that the perforated area of plate 40 be approximately one percent (1%) less than the area of the opening at the inlet 20.

On the other hand, plate 42 is perforated substantially throughout its entire area so as to have a plurality of openings 52 as shown in Fig. 3.

The plate 32 is provided with a substantially central opening 54 which extends therethrough. It has been found that more efficient trapping and drainage may be effected if this opening 54 is located at a point in the plate below the inlet 20 and below the connection between the lower baffle plate 32 and the lower baffle plate 42. Clearly, the opening 54 leads into the chamber between the plates 30 and 32.

A substantially central opening 56 is also provided in the baffle 30 to afford communication with the chamber having access to the outlet 22. It has been found that more satisfactory results are obtainable if the opening 54 is of greater area than the opening 56 and is located above the outlet 22 as shown so that the velocity of the air passing through the trap when under pressure is less when going through the lower opening 54 than when going through the opening 56 adjacent the outlet 22.

With this arrangement, air under pressure entering the inlet 20 proceeds through openings 50 in baffle plate 40 and through openings 52 in plate 42 to the lowermost chamber in the pipe. Then there is an upward passage through the hole 54 into the chamber between the plates 30 and 32, out through the opening 56 into the uppermost chamber, which, as previously stated, affords access to the outlet 22.

Thus it will be seen that water and air entering the inlet 20 pass downwardly to the contact plate 40 where some air and water are separated passing through the openings 50 and proceeding to contact plate 42 where more separation is brought about. The openings 52 allow further passage and the drippings fall downwardly towards the drain 14 while the air, of course, being under pressure passes upwardly through the openings 54 and 56. The water, being heavier than the air, fills the cylindrical reservoir through its own weight and is allowed to be emitted by means of the drain 18.

To overcome an objection which is common to all prior trap devices, the openings 34, 36, 44 and 46 prevent the water and dirt particles from collecting in the pockets which would obviously be formed were the baffle plates extended directly to the wall. The openings permit these objectionable elements to readily flow therethrough instead of settling in the pockets.

By such holes, water above the baffle plates 30, 32, 40 and 42 is prevented from collecting until it drips through the holes in the plates when it could be again picked up by the air stream.

While the invention has been described in great detail and with respect to the present preferred form thereof, it is not desired to be limited thereto since many changes and modifications may be made therein without departing from the spirit and scope of the invention. What it is desired to claim and secure by Letters Patent of the United States is:

1. The combination in a water trap consisting of a hollow body provided with a drain in its lower end and inlet and outlet openings in the sides thereof adjacent its upper end, of a pair of baffle plates within the body inclining downwardly away from the inlet side thereof towards the outlet side thereof, one of said baffle plates being spaced above and in substantial parallelism with the other and each having an opening therethrough, the upper ends of said baffle plates being secured to the body and their lower ends being spaced from the wall of the body, and a perforated baffle member inclining downwardly away from the lower of said baffle plates towards the inlet side of said body, said baffle member having its upper end secured to the lower side of said lower baffle plate at a point above the opening therein and its lower end being spaced from the wall of the body, all adapted and arranged whereby air forced into said inlet may pass downwardly through the perforations in said baffle member and through the opening in said lower baffle plate and upwardly in the space between the baffle plates and out through the opening in the upper baffle plate and then out said outlet.

2. The combination in a water trap consisting of a hollow tubular body having horizontal top and bottom walls and a vertical side wall and provided with a drain in its bottom wall and oppositely-disposed inlet and outlet openings in its side wall adjacent its upper wall, of a baffle plate within the body inclining downwardly away from said top wall adjacent the inlet towards the outlet side of the body, another baffle plate within the body inclining downwardly away from the side wall adjacent the inlet towards the outlet side of the body, said baffle plates being spaced apart and in substantial parallelism with each other and each having an opening therethrough, the upper end of the first-named baffle plate being secured to said top wall and the upper end of the second-named baffle plate being secured to said side wall and the lower ends of said baffle plates being spaced from said side wall, and a perforated baffle member inclining downwardly away from said second-named baffle plate towards the inlet side of said body, said perforated baffle member having its upper end secured to the lower side of said second-named baffle plate at a point above the opening therein and its lower end being spaced from said side wall, all adapted and arranged whereby air forced into said inlet may pass downwardly through the perforations in said baffle member and through the opening in the second-named baffle plate and upwardly in the space between the baffle plates and out through the opening in the first-named baffle plate and then out said outlet.

SARAH E. BROWNING,
*Administratrix of the Estate of Thomas C. Browning, Deceased.*